United States Patent
Diab

(10) Patent No.: US 7,974,305 B2
(45) Date of Patent: Jul. 5, 2011

(54) INBAND MANAGEMENT FOR POWER OVER ETHERNET MIDSPANS USING AN EMBEDDED SWITCH

(75) Inventor: Wael William Diab, San Francisco, CA (US)

(73) Assignee: Broadcom Corporation, Irvine, CA (US)

(*) Notice: Subject to any disclaimer, the term of this patent is extended or adjusted under 35 U.S.C. 154(b) by 1207 days.

(21) Appl. No.: 11/518,942

(22) Filed: Sep. 12, 2006

(65) Prior Publication Data

US 2007/0223520 A1   Sep. 27, 2007

Related U.S. Application Data

(60) Provisional application No. 60/785,314, filed on Mar. 24, 2006.

(51) Int. Cl.
*H04L 12/66* (2006.01)
*H04J 3/00* (2006.01)

(52) U.S. Cl. ......... 370/463; 370/521; 713/300; 340/538

(58) Field of Classification Search .................. None
See application file for complete search history.

(56) References Cited

U.S. PATENT DOCUMENTS

| | | | |
|---|---|---|---|
| 6,473,608 | B1 | 10/2002 | Lehr et al. |
| 7,035,228 | B2 | 4/2006 | Baumer |
| 7,455,527 | B2* | 11/2008 | Nordin et al. ............ 439/49 |
| 7,650,519 | B1* | 1/2010 | Hobbs et al. ............ 713/300 |
| 7,711,967 | B2* | 5/2010 | Woo et al. ............ 713/300 |
| 7,852,873 | B2* | 12/2010 | Bird .................. 370/463 |
| 2003/0179771 | A1 | 9/2003 | Chan et al. |
| 2005/0097369 | A1* | 5/2005 | Bowser et al. ........... 713/300 |
| 2009/0031152 | A1* | 1/2009 | Bolderl-Ermel et al. ... 713/300 |
| 2009/0063874 | A1* | 3/2009 | Diab ................. 713/300 |
| 2010/0257381 | A1* | 10/2010 | Woo et al. ............ 713/300 |

OTHER PUBLICATIONS

Search Report, dated Feb. 19, 2007, for EP Patent Application No. 06023166.9-2416, 4 pgs.
"3Com® IntelliJack™ Switch Produktreihe: Die innovative Aufputz-Losung", 3Com, XP002418343, www.3com.de/pdf/intel_switch.pdf, Aug. 2003, pp. 1-4.

* cited by examiner

*Primary Examiner* — Gregory B Sefcheck
(74) *Attorney, Agent, or Firm* — Sterne, Kessler, Goldstein & Fox P.L.L.C.

(57) ABSTRACT

Power over Ethernet (PoE) communication systems provide power and data communications over the same communications link, where a power source device (PSE) provides DC power (for example, 48 volts DC) to a powered device (PD). The DC power is transmitted simultaneously over the same communications medium with the high speed data from one node to the other node. For data-only switches (i.e. non-PoE), a midspan device is connected between the data-only switch and the PD devices so as to inject the DC power for the PD devices. The midspan device includes a combination data and management port that communicates both high speed data packets and management packets with the data-only switch. The combination data/management port obviates the need for a dedicated management port on both the midspan and the data-only switch. This eliminates the need to use an extra port on the data switch thus making better port utilization at the data switch as well as lowing the cost of the midspan.

16 Claims, 7 Drawing Sheets

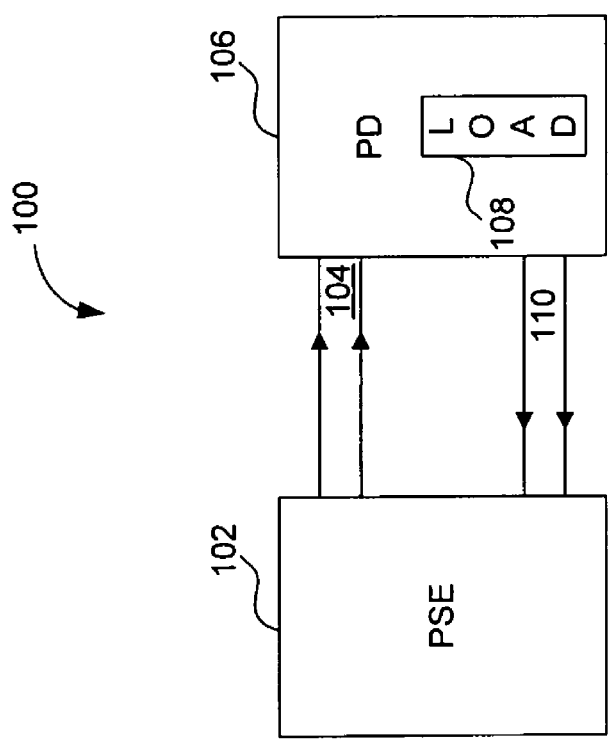
FIG. 1
(Conventional)

INBAND MANAGEMENT FOR POWER OVER ETHERNET MIDSPANS USING AN EMBEDDED SWITCH

CROSS REFERENCE TO RELATED APPLICATIONS

This application claims benefit of U.S. Provisional Patent No. 60/785,314, filed on Mar. 24, 2006, which is incorporated by reference herein in its entirety.

BACKGROUND OF THE INVENTION

1. Field of the Invention

The present invention generally relates to Power over Ethernet (PoE) devices, and more specifically to midspans for PoE with inband power management.

2. Related Art

Ethernet communications provide high speed data communications over a communications link between two communications nodes that operates according the IEEE 802 Ethernet Standard. The communications medium between the two nodes can be twisted pair wires for Ethernet, or other types communications medium that are appropriate. Power over Ethernet (PoE) communication systems provide power and data communications over a common communications link. More specifically, a power source device (PSE) connected to the physical layer of the first node of the communications link provides DC power (for example, 48 volts DC) to a powered device (PD) at the second node of the communications link. The DC power is transmitted simultaneously over the same communications medium with the high speed data from one node to the other node.

Example PD devices that utilize PoE include Internet Protocol (IP) phones, wireless access points, etc. The PSE device is often a data switch having has least two rows of data ports, where a data port in the input row of data ports can to be switched to any one of the data ports in the output row of data ports. Each data port typically includes a serial-to-parallel (i.e. SERDES) transceiver, and/or a PHY device, to support high speed serial data transport. Herein, data ports and their corresponding links can be interchangeably referred to as data channels, communication links, data links, etc, for ease of discussion.

Despite the advantages of PoE, many existing communication links do not utilize PoE and transfer only pure data. Accordingly, some existing switches are data-only switches that do not support power transfer, i.e., they are non-PoE switches. However, in some configurations, these data-only switches may need to communicate with PD devices on a number of their data ports. In this scenario, a midspan switch is connected between the data-only switch and the PD devices in order to inject the DC power to operate the PD devices.

A midspan controller, which is external to the midspan, manages the DC power injection by the midspan using management traffic that is communicated with the data-only switch. Current midspans utilize a separate management port to receive and process the management traffic that passes from the switch through the midspan to the external midspan controller, and vice versa. This separate management port on the midspan necessitates that the data-only switch also dedicate a data port to management traffic, which is an inefficient use of data ports on both the data-only switch and the midspan.

What is needed is a midspan configuration that does not require a dedicated port to be used for management traffic, so as to improve the integrated circuit die area efficiency for both the switch and the midspan.

BRIEF SUMMARY OF THE INVENTION

In one embodiment, the present invention includes a PoE midspan configuration that includes a plurality of data-only ports, and at least one combination data and management port. The combination data and management port communicates both high speed data packets and management packets with the data-only switch in order to obviate the disadvantages mentioned above for conventional PoE midspans. This obviates the need for a dedicated management port on both the midspan and the data-only switch. Accordingly, this frees up one port on the data-only switch that can be used for additional PoE or non-PoE applications.

The combined data and management port includes a 3 port switch having a switch port, a PD port, and a management port. During operation, the data traffic processed by the switch port is directly communicated to the PD port, and vice versa. Whereas, the management traffic processed by the switch port is diverted by the management port to a midspan controller/CPU, so that the controller/CPU and the data-only switch can determine the power requirements of the PD devices that are connected to the midspan.

Additional features and advantages of the invention will be set forth in the description that follows, and in part will be apparent from the description, or may be learned by practice of the invention. The advantages of the invention will be realized and attained by the structure and particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

FIG. 1 is a block diagram of a conventional Power over Ethernet (PoE) system.

Figure 5:
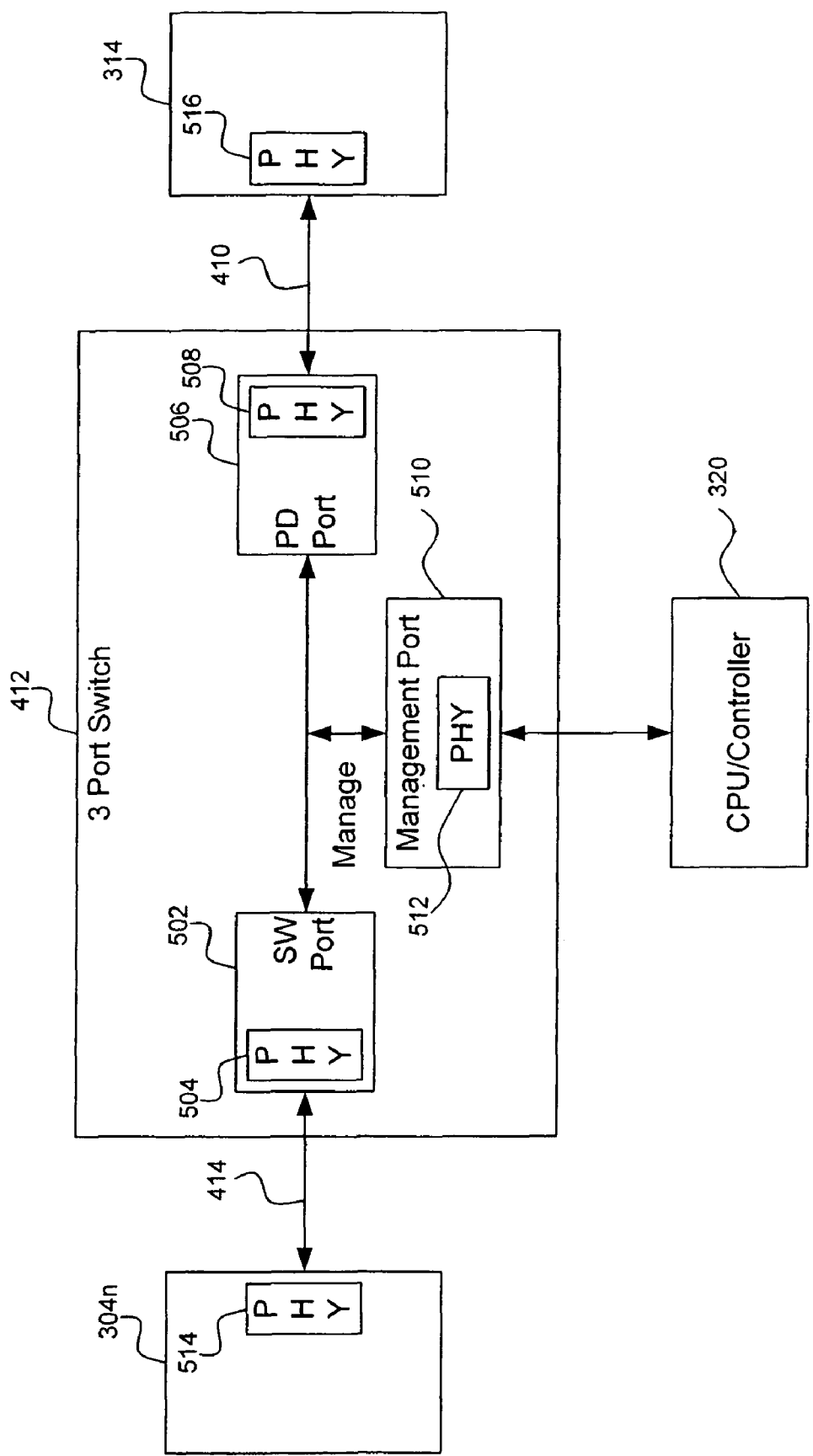

FIG. 5 further illustrates the combined data and management port, according to embodiments of the invention.

Figure 6:
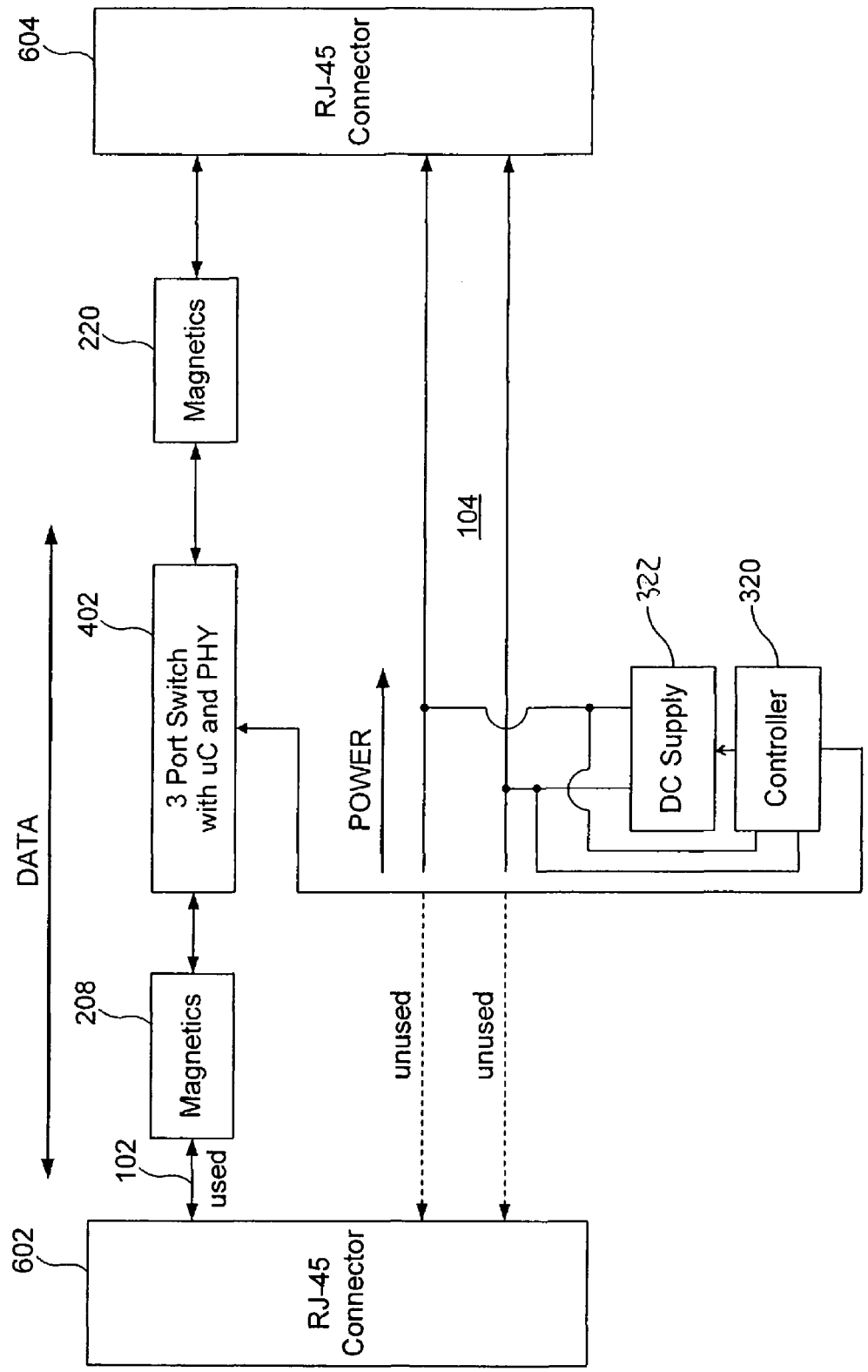

FIG. 6 illustrates a PoE configuration for 10/100 Ethernet, according to embodiments of the present invention.

Figure 7:
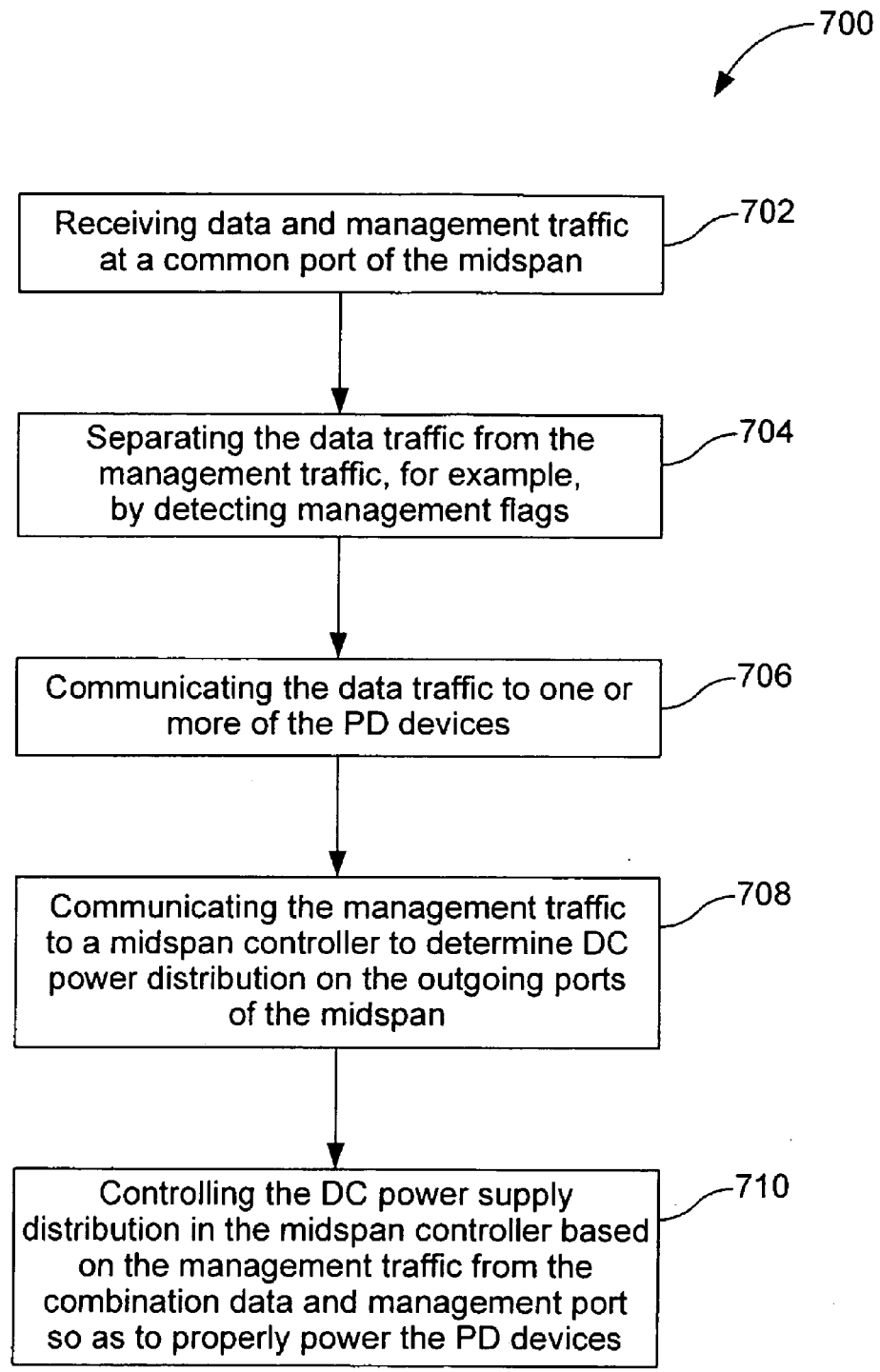

FIG. 7 illustrates a flowchart that further describes the operational steps of one embodiment of the invention.

DETAILED DESCRIPTION OF THE INVENTION

FIG. 1 illustrates a high level diagram of a conventional Power over Ethernet (PoE) system 100 that provides both DC power and data communications over a common data communications medium. Referring to FIG. 1, power source equipment 102 provides DC power over conductors 104, 110 to a powered device (PD) 106 having a representative electrical load 108. The PSE 102 and PD 106 also include data transceivers that operate according to a known communications standard, such as the IEEE Ethernet standard. More specifically, the PSE 102 includes a physical layer device on the PSE side that transmits and receives high speed data with a corresponding physical layer device in the PD 106, as will be discussed further below. Accordingly, the power transfer between the PSE 102 and the PD 106 occurs simultaneously with the exchange of high speed data over the conductors 104, 110. In one example, the PSE 102 is a data switch having multiple ports that is communication with one or more PD devices, such as Internet phones, or a wireless access point.

The conductor pairs 104 and 110 can carry high speed differential data communications. In one example, the conductor pairs 104 and 110 each include one or more twisted wire pairs, or any other type of cable or communications media capable of carrying the data transmissions and DC power transmissions between the PSE and PD. In Ethernet communications, the conductor pairs 104 and 110 can include multiple twisted pairs, for example four twisted pairs for 10 Gigabit Ethernet. In 10/100 Ethernet, only two of the four pairs carry data communications, and the other two pairs of conductors are unused. Herein, conductor pairs may be referred to as Ethernet cables or communication links for ease of discussion.

Figure 2:
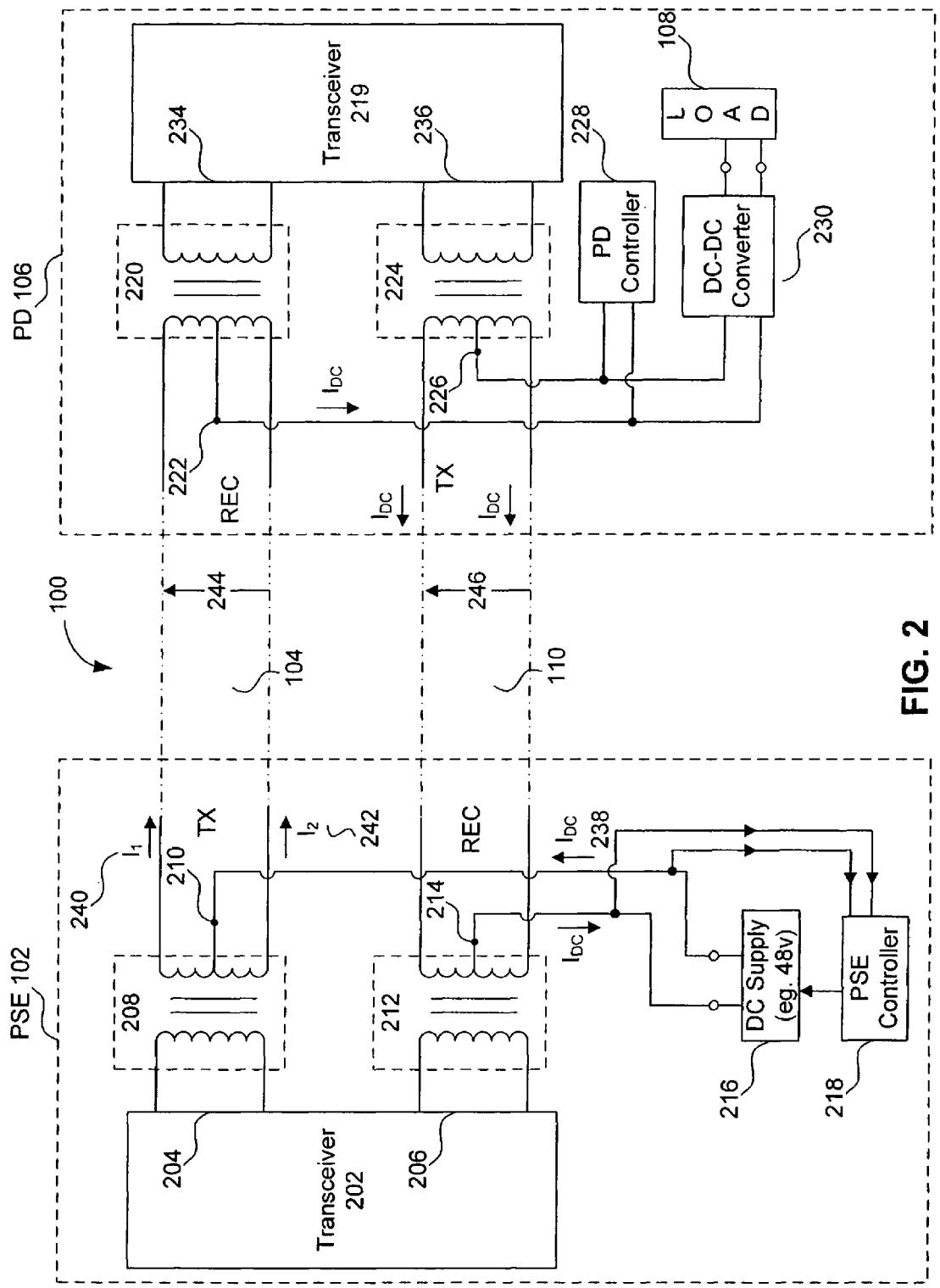
FIG. 2 illustrates a more detailed figure of the conventional power transfer from the Power Source Equipment (PSE) to the Powered Device (PD) in a conventional PoE communications system.

FIG. 2 provides a more detailed circuit diagram of the PoE system 100, where PSE 102 provides DC power to PD 106 over conductor pairs 104 and 110. PSE 102 includes a transceiver physical layer device (or PHY) 202 having full duplex transmit and receive capability through differential transmit port 204 and differential receive port 206. (Herein, transceivers may be referred to as PHYs) A first transformer 208 couples high speed data between the transmit port 204 and the first conductor pair 104. Likewise, a second transformer 212 couples high speed data between the receive port 206 and the second conductor pair 110. The respective transformers 208 and 212 pass the high speed data to and from the transceiver 202, but isolate any low frequency or DC voltage from the transceiver ports, which may be sensitive large voltage values.

The first transformer 208 includes primary and secondary windings, where the secondary winding (on the conductor side) includes a center tap 210. Likewise, the second transformer 212 includes primary and secondary windings, where the secondary winding (on the conductor side) includes a center tap 214. The DC voltage supply 216 generates an output voltage that is applied across the respective center taps of the transformers 208 and 210 on the conductor side of the transformers. The center tap 210 is connected to a first output of a DC voltage supply 216, and the center tap 214 is connected to a second output of the DC voltage supply 216. As such, the transformers 208 and 212 isolate the DC voltage from the DC supply 216 from the sensitive data ports 204, 206 of the transceiver 202. An example DC output voltage is 48 volts, but other voltages could be used depending on the voltage/power requirements of the PD 106.

The PSE 102 further includes a PSE controller 218 that controls the DC voltage supply 216 based on the dynamic needs of the PD 106. More specifically, the PSE controller 218 measures the voltage, current, and temperature of the outgoing and incoming DC supply lines so as to characterize the power requirements of the PD 106.

Further, the PSE controller 218 detects and validates a compatible PD, determines a power classification signature for the validated PD, supplies power to the PD, monitors the power, and reduces or removes the power from the PD when the power is no longer requested or required. During detection, if the PSE finds the PD to be non-compatible, the PSE can prevent the application of power to that PD device, protecting the PD from possible damage. IEEE has imposed standards on the detection, power classification, and monitoring of a PD by a PSE in the IEEE 802.3af™ standard, which is incorporated herein by reference.

Still referring to FIG. 2, the contents and functionality of the PD 106 will now be discussed. The PD 106 includes a transceiver physical layer device 219 having full duplex transmit and receive capability through differential transmit port 236 and differential receive port 234. A third transformer 220 couples high speed data between the first conductor pair 104 and the receive port 234. Likewise, a fourth transformer 224 couples high speed data between the transmit port 236 and the second conductor pair 110. The respective transformers 220 and 224 pass the high speed data to and from the transceiver 219, but isolate any low frequency or DC voltage from the sensitive transceiver data ports.

The third transformer 220 includes primary and secondary windings, where the secondary winding (on the conductor side) includes a center tap 222. Likewise, the fourth transformer 224 includes primary and secondary windings, where the secondary winding (on the conductor side) includes a center tap 226. The center taps 222 and 226 supply the DC power carried over conductors 104 and 106 to the representative load 108 of the PD 106, where the load 108 represents the dynamic power draw needed to operate PD 106. A DC-DC converter 230 may be optionally inserted before the load 108 to step down the voltage as necessary to meet the voltage requirements of the PD 106. Further, multiple DC-DC converters 230 may be arrayed in parallel to output multiple different voltages (3 volts, 5 volts, 12 volts) to supply different loads 108 of the PD 106.

The PD 106 further includes a PD controller 228 that monitors the voltage and current on the PD side of the PoE configuration. The PD controller 228 further provides the necessary impedance signatures on the return conductor 110 during initialization, so that the PSE controller 218 will recognize the PD as a valid PoE device, and be able to classify its power requirements.

During ideal operation, a direct current ($I_{DC}$) 238 flows from the DC power supply 216 through the first center tap 210, and divides into a first current ($I_1$) 240 and a second current ($I_2$) 242 that is carried over conductor pair 104. The first current ($I_1$) 240 and the second current ($I_2$) 242 then recombine at the third center tap 222 to reform the direct current ($I_{DC}$) 238 so as to power PD 106. On return, the direct current ($I_{DC}$) 238 flows from PD 106 through the fourth center tap 226, and divides for transport over conductor pair 110. The return DC current recombines at the second center tap 214, and returns to the DC power supply 216. As discussed above, data transmission between the PSE 102 and the PD 106 occurs simultaneously with the DC power supply described above. Accordingly, a first communication signal 244 and/or a second communication signal 246 are simultaneously differentially carried via the conductor pairs 104 and 110 between the PSE 102 and the PD 106. It is important to note that the communication signals 244 and 246 are differential signals that ideally are not effected by the DC power transfer.

As discussed above, in one example, the PSE 102 is a data switch that that is communicating data traffic with one or more PD devices, such as Internet phones, or a wireless access point. The data switch has an input row of data ports and an output row of data ports, where any one of the input data ports can be switched to any one of the output data ports. Each data port typically includes a serial-to-parallel (i.e. SERDES) transceiver so that data can be received and transmitted using high speed serial techniques, but are processed in parallel on chip.

Despite the advantages of PoE, many existing communications links do not utilize PoE. Accordingly, some existing switches are data-only switches that do not support power transfer, i.e., they are non-PoE switches. However, often these data-only switches may need to communicate with PD devices on a small number of their ports. In this scenario, a midspan switch is connected between the PSE switch and the PD devices so as to inject the DC power for the PD devices.

Figure 3:
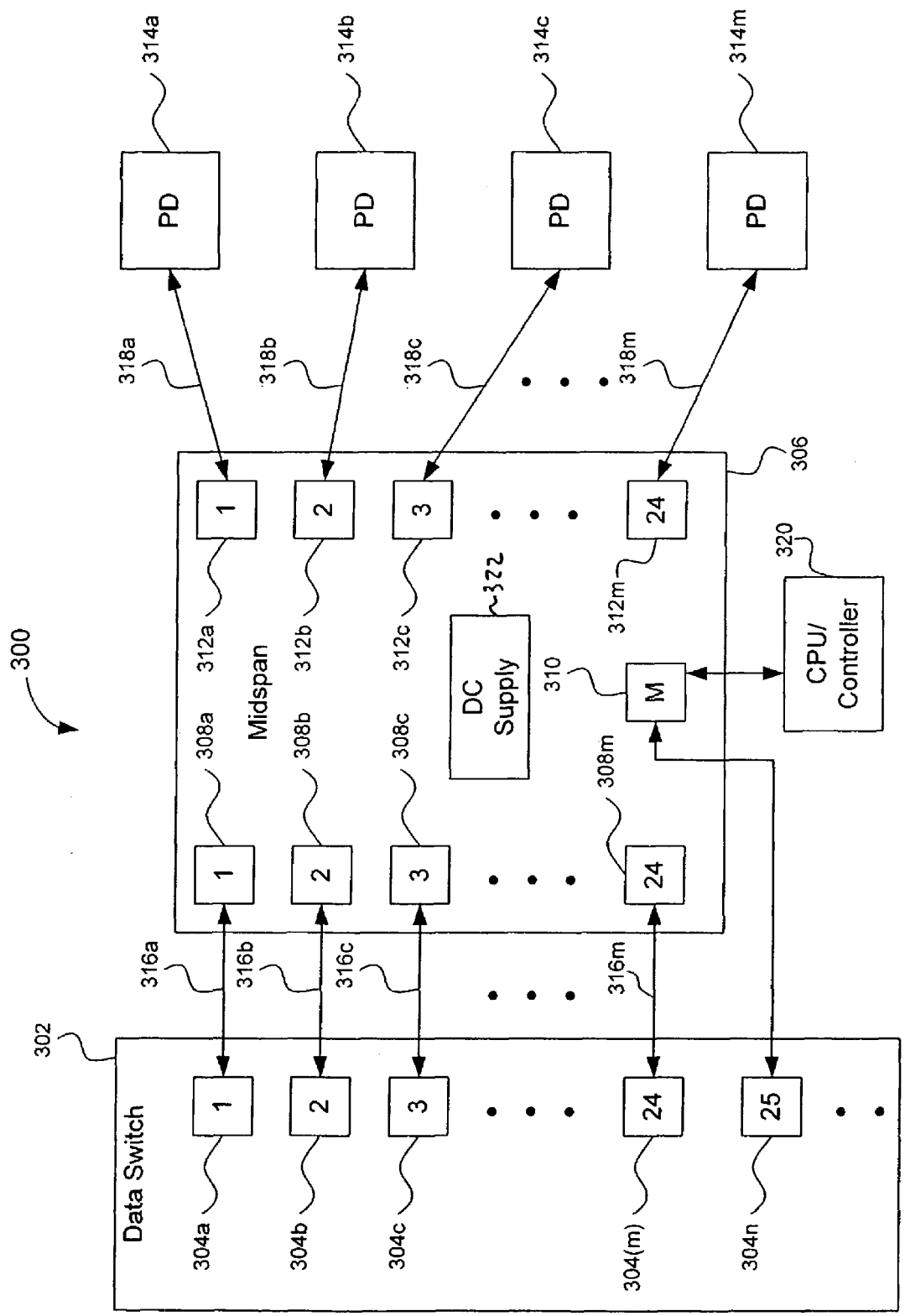
FIG. 3 illustrates the conventional midspan configuration in the Power over Ethernet configuration, where the midspan has a dedicated management port.

FIG. 3 illustrates a conventional midspan communications system 300 including a data-only switch 302, a midspan 304, multiple PD 306a-m, and a midspan controller 320. The data-only switch 302 has multiple transceiver ports 304a-n that are only capable of transmitting and receiving data. In other words, the data-only switch 302 supports high speed Ethernet communications, but does not support PoE and therefore cannot provide DC power to the PDs 314. (The data-only switch does support the communication of management traffic (e.g packets), which is just another form of data.) However, there are occasions (as shown in FIG. 3) where the data-only switch 302 communicates with Powered Devices 314a-m, which are designed to be powered over the communications medium. Accordingly, the midspan 306 is inserted between the data-only switch 302 and the PDs 314 so as to inject the DC power needed to supply the PDs 314.

The midspan 306 includes transceiver data ports 308a-m that communicate high-speed data with the data-only switch 302 over corresponding communications links 316a-m. Likewise, the midspan 306 also includes transceiver data ports 312a-m that communicate high-speed data with the PDs 314a-m over corresponding communication links 318a-m. The midspan 306 includes a DC power supply 322 and magnetics (e.g. transformers) similar to that shown in FIG. 2, so as to inject the appropriate DC power to supply the PDs 314a-m. The conventional midspan 306 further includes a management port 310 that is dedicated to passing power management traffic between the data-only switch 302 and the midspan controller 320. The management traffic is necessary for the switch 302 and the midspan controller 320 to communicate the power requirement needs of the PDs 314, which are to be powered by the midspan 306. It is noted that the management traffic may carry other management information as well. For example, it could also carry manufacture's information regarding the midspan. The midspan controller 320 then programs the power supply 322 for each of the ports 312a-m in the midspan 306 based on the power requirement needs of the PDs 314a-m. The midspan controller 320 also performs various other house keeping functions for the midspan 306 such as monitoring the power requirements of the various ports over time in comparison to the total power supply available.

The power management traffic is transmitted at a relatively low data rate compared to the high speed Ethernet data carried by the Ethernet links 316. Further, the midspan management port 310 is a dedicated port that carries only management traffic, meaning the corresponding port 304n on the data-only switch 302 is also exclusively dedicated to carrying the power management traffic. Given the relatively low data rate for management traffic, the conventional midspan configuration of utilizing a dedicated management port is an inefficient use of silicon chip area for both the midspan 306 and the data-only switch 302. Further, the number of system ports, and therefore cost, is also increased by having a dedicated management port. Still further, data switches preferably have an even number of ports, (e.g. 24, 48, etc.). Therefore the extra management port 304n on the data switch adds an extra odd-numbered port (25 in FIG. 3) that detracts from the even symmetry of the silicon device. A switch or midspan having an odd number of ports is inherently undesirable, due to the fact that most communication racks that house the switches are typically designed to house devices with an even number of ports.

It is noted that the management packets described herein include, but are not limited to, layer 2 or higher packets and frames of the well-known IEEE communications layer protocol.

Figure 4:
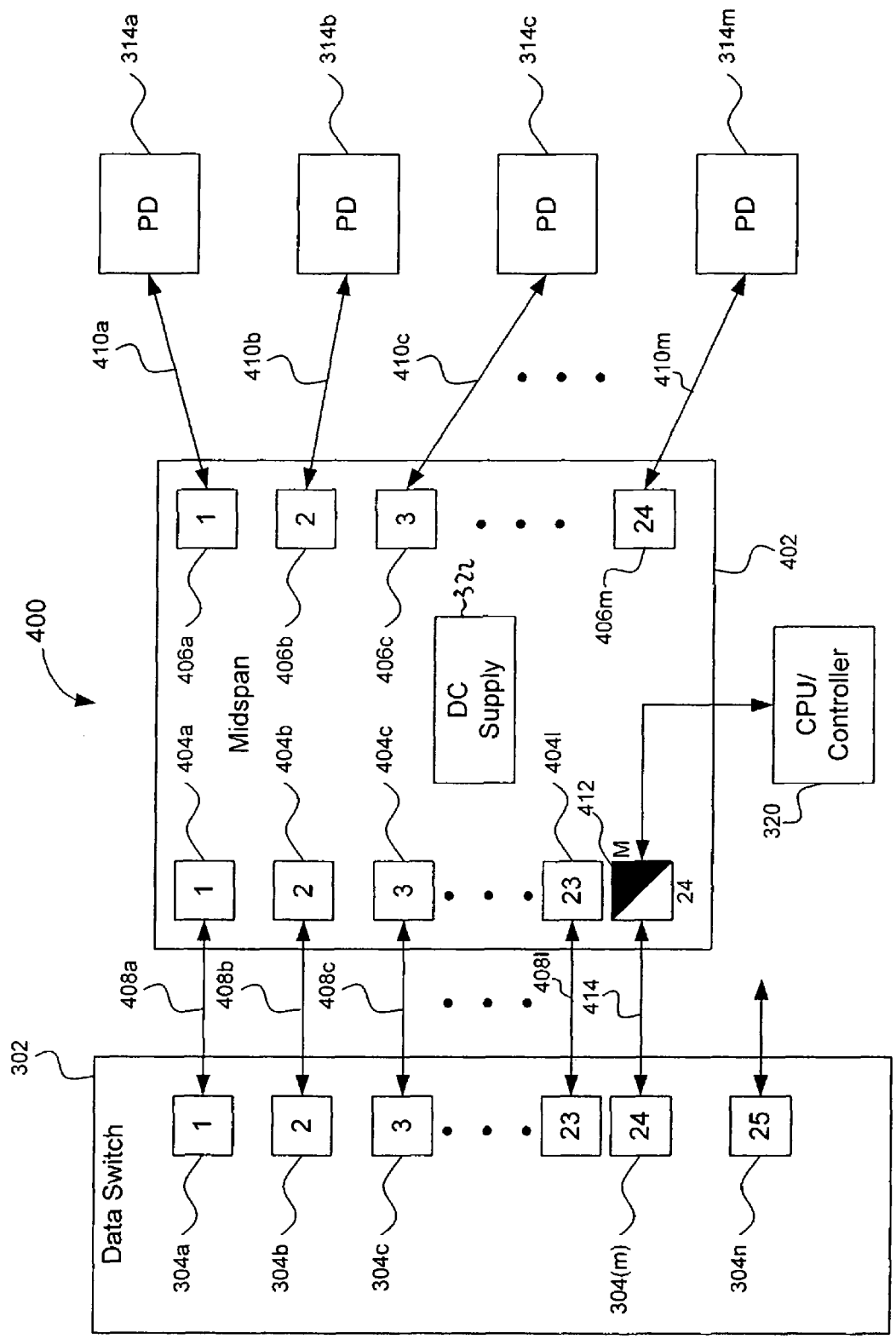
FIG. 4 illustrates the midspan configuration with a combination data and management port, according to embodiments of the present invention.

FIG. 4 illustrates a midspan communications system 400 according to embodiments of the present invention. The midspan communications system 400 includes the data-only switch 302, a midspan 402, and the PD 314a-m, where the midspan 402 is configured such that it does not require a separate management port for the processing of power management traffic with the data switch 302. Accordingly, both the midspan 402 and the data-only switch 302 can be configured to more efficiently use their available silicon area.

The midspan 402 includes transceiver data ports 404a-1 that communicate high-speed data with the data-only switch 302 over corresponding communications links 408a-1. Likewise, the midspan 404 also includes transceiver data ports 406a-m that communicate high-speed data with the PDs 314a-m over corresponding communication links 410a-m. As with midspan 306, the midspan 402 includes a DC power supply and magnetics (e.g. transformers) similar to that shown in FIG. 2, so as to inject the appropriate DC power to supply the PD 314a-m.

The midspan 402 also includes a combination data and management port 412 that processes both data and power management traffic. The power management traffic is communicated between the data switch 302 and the midspan controller 320 so as to manage the DC power injection on the outgoing midspan ports 406a-m to the PDs 314a-m. The data/management port 412 processes both high speed Ethernet data from the data switch 302 and the low speed power management traffic on the single port over a combined Ethernet and management link 414. The high speed Ethernet traffic is directed to any one of the ports 406a-m so as to effect communication with the PDs 314a-m. The low speed management traffic is directed to the external midspan controller 320 so the data switch 302 and the midspan controller 320 can communicate regarding the power supply needs of the PDs 314. As such, the combination data and management port 412 obviates the need for a dedicated management port on the midspan 402, and on the data-only switch 302. As seen in FIG. 4, this has an obvious benefit for the data-only switch 302 because the port 304n is freed-up for additional data-only communications. Whereas, in the conventional midspan configuration 300, the switch port 304n was needed for management traffic. Accordingly, the freed switch port 304n can be used for an additional PoE data link that is coupled to another midspan, or it can be used for a non-PoE data link. In other words, it can be used to communicate with non-PoE devices. Alternatively, the freed switch port 304n can simply be eliminated so that the data switch 302 has an even number of ports. Either way, the IC device area is more efficiently used as compared with the conventional configuration that is shown in FIG. 3.

FIG. 5 illustrates the combination data/management port 412 in greater detail. Specifically, the combination data/management port 412 includes a switch port 502 having a PHY 504, a PD port 506 having a PHY 508, and a management port 510 having a PHY 512. Port 304n in data switch 302 includes a PHY 514, and PD 314 includes a PHY 516. The PHYs 504, 508, 512, 514, and 516 in their respective ports can be similar to the data transceivers 202 and 204 that are shown in FIG. 2. Example transceivers (i.e. PHYs) are further described in U.S. Pat. No. 7,035,228, and U.S. patent application Ser. No. 10/392,831, both of which are incorporated herein by reference.

During operation, the data traffic processed by the switch port 502 is directly communicated to the PD port 506, and vice versa. Whereas, the management traffic processed by the switch port 502 is diverted by the management port 512 to the CPU/Controller 320. Specifically, the management port 512 monitors the data packets processed by the switch port 502 for management flags, etc., and diverts any management packets to the CPU/Controller 320. It is not expected that the PD port 506 would receive management traffic for transmission to the CPU/Controller 320, as power management for the PDs 314 is expected to be negotiated only between the CPU/Controller 320 and the data-only switch 302.

The switch port 502 communicates the combined data and management traffic over the communications link 414 with the switch port 304n of the data-only switch 302 using a known communications standard. The PD port 506 communicates the pure data traffic with the PD devices 314 over communications link 410 using a known communications standard as discussed earlier. In one embodiment, the communications standards for switch port 502 and the PD port 506 is XMII, or a another applicable standard. The management port 510 communicates the power management traffic with the CPU/Controller 320. It is expected that the power management traffic is slower that the data traffic so that slower communications standard can be utilized such as MII, or another applicable standard.

As discussed above, the power management traffic is directed at managing the power flow to the PD devices 314a-n. In doing so, the protocol for management can be any appropriate protocol including, but not limited to, any one of the following: Link Layer Development Protocol (LLDP); Simple Network Management Protocol (SNMP); and Operation, Administration, and Maintenance (OAM) protocol, which are well known protocols to those skilled in the arts. The management protocol used herein is not limited to the protocols mentioned above, as other protocols could be used as will be understood by those skilled in the arts.

LLDP defines a standard method for Ethernet network devices such as switches, routers, and wireless LAN access points to advertise information about themselves to other nodes on the network and store the information they discover. LLDP runs on all 802 media.

SNMP is a set of protocols for managing complex networks. SNMP works by sending messages, called protocol data units (PDUs), to different parts of a network. SNMP-compliant devices, called agents, store data about themselves in Management Information Bases (MIBs) and return this data to the SNMP requesters.

FIG. 6 further illustrates a PoE configuration 600 for 10/100 Ethernet communications with RJ-45 connectors on the PSE and PD, according to embodiments of the present invention. 10/100 Ethernet utilizes only two pair of the four pair of Ethernet conductors 102 and 104 for data transmission, (e.g. 102), because the transmission rate is relatively low at 100 Mbps. The other two pairs 104 are not used for data transmission and can be used exclusively for power transmission, as shown in FIG. 6. The RJ-45 connectors 602 and 604, have eight active pins, four of which are used for data, and four of which are used power. Of the four pins used for power, two are used for outgoing DC current and the other two pins are used for the return.

The 10-Gigabit and 1 Gigabit Ethernet configurations operate similar to FIG. 6, except that at all four pairs of conductors and corresponding pins are used for data transfer. Accordingly, the power transfer to the PDs occurs simultaneously with the data transfer on all four pairs of conductors and corresponding pins.

FIG. 7 illustrates a flowchart 700 that further describes a method of PD power management in a midspan device, according to embodiments of the present invention. For example, the steps described herein could be performed by the combination data and management port described in the midspan device 402 of FIG. 4, or some other equivalent device.

Referring to flowchart 700, in step 702, data traffic and power management traffic is received at a common port. For example, the combination data and management port 412 receives data traffic and power management traffic.

In step 704, the data traffic is separated from the power management traffic. For example, management flags could be searched and detected to identify the management traffic so that it can be separated from the data traffic.

In step 706, the data traffic is communicated to one or more of the PD devices. For example, referring to FIG. 4, the data traffic received at the combination data and management port 412 can be switched to the corresponding data port 406 for communication to the appropriate PD 314.

In step 708, the management traffic is communicated to a midspan controller to determine the DC power distribution on the outgoing ports 406a-m. For example, the controller/CPU 320 in FIG. 4 negotiates the power management distribution by communicating with the data-only switch 302.

In step 710, the DC power supply in the midspan controller is controlled based on the management traffic from the combination data and management port 412, so as to properly distribute the DC power to the outgoing ports 406a-m.

This invention relating to midspans has been described herein in an Ethernet environment for ease of discussion. Accordingly, the scope of the invention is meant to include all forms of Ethernet configurations, and data speeds, including for example 10/100 Ethernet, 1 Gigabit Ethernet, and 10 Gigabit Ethernet. However, the midspan invention is not limited to Ethernet communications, and may be utilized in other communications standards or configurations, as will be understood by those skilled in arts based on the discussion provided herein. In other words, the scope of the invention is not limited to Ethernet, and may be used in other communication standards, as will be understood by those skilled in the arts based on the discussion given herein.

CONCLUSION

While various embodiments of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. A midspan device for use in a Power over Ethernet (PoE) communications system, comprising:

a first plurality of data ports and a second plurality of data ports, any one of said first plurality of data ports capable of being selectively coupled to any one of said second plurality of data ports; and a DC power supply configured to provide DC power to one or more of said second plurality of data ports;

wherein said first plurality of data ports includes a combination data and management port having a three port switch comprising a switch port, a powered device (PD) port, and a management port, said combination data and management port configured to: receive data traffic and management traffic at said switch port, separate said management traffic from said data traffic and forward said management traffic to said management port for further processing, and forward said data traffic to said PD port that is coupled to one of said second plurality of data ports.

2. The midspan device of claim 1, wherein said PoE communications system includes a data switch coupled to said first plurality of ports of said midspan, and one or more powered devices PD coupled to said second plurality of ports of said midspan, wherein said combination data and management port communicates said data traffic and said management traffic with said data switch.

3. The midspan device of claim 2, wherein said management traffic controls said DC power supply based on power requirements of said one or more PDs.

4. The midspan device of claim 3, wherein said management traffic determines the distribution of DC power to said second plurality of data ports based on said power requirements of said PDs.

5. The midspan device of claim 2, wherein said combination data and management port communicates said management traffic between said data switch and a midspan controller coupled to said midspan device.

6. The midspan device of claim 5, wherein said midspan controller and said data switch determine the DC power distribution to said second plurality of data ports of said midspan by communicating said management traffic via said combination data and management port of said midspan.

7. The midspan device of claim 1, wherein said first plurality of data ports and said second plurality of data ports transmit and receive data according to an Ethernet based standard.

8. The midspan device of claim 1, wherein said switch port is coupled to a data switch over a first communications link, and said PD port is coupled to a PD device over a second communications link, and said management port is coupled to a midspan controller.

9. The midspan device of claim 8, wherein said management port communicates with said midspan controller according to a management protocol.

10. In a Power over Ethernet (PoE) system having a data switch communicating with one or more powered device (PDs) using a midspan device, a method of managing DC power distribution in the midspan device to the one or more PDs, comprising:

receiving data traffic and power management traffic from said data switch on a combination data and management port of said midspan device, said combination data and management port including a three port switch having a switch port, a PD port, and a management port;

separating said power management traffic from said data traffic and sending said power management traffic to said management port for further processing;

communicating said data traffic to one of said PDs via said PD port; and determining said DC power distribution to said one or more PDs based on said power management traffic.

11. The method of claim 10, wherein said determining step includes:

communicating said power management traffic to a midspan controller to determine said DC power distribution; and controlling a DC power supply in said midspan device based on said management traffic from said midspan controller.

12. The method of claim 11, wherein one of said steps of receiving and communicating said data traffic is performed according to an Ethernet communications standard, and wherein said step of communicating said power management traffic is performed according to a management protocol.

13. A communications system, comprising;

a data switch having a first plurality of data ports;

one or more powered devices (PDs); and a midspan device disposed between said data switch and said powered device, said midspan device including a second plurality of data ports coupled to said first plurality of said data switch through a first communications link, and a third plurality of data ports coupled to said one or more PD devices though a second communications link, wherein said second plurality of data ports includes a combination data and management port that communicates data and power management traffic with a corresponding port of said data switch, wherein said combination data and management port separates said power management traffic from said data traffic and forwards said power management traffic to a management port for further processing; and wherein said combination data and management port includes a three port switch, having a switch port, a PD port, and said management port, wherein said switch port receives said data and management traffic, wherein said data traffic is forwarded directly between said switch port and said PD port, and said management traffic is diverted to said management port.

14. The communications system of claim 13, wherein said midspan device provides DC power to said one or more PD devices over said second communications link, wherein said power management traffic determines the power distribution of said DC power to said third plurality of data ports.

15. The communications system of claim 14, further comprising a midspan controller coupled to said combination data and management port, said midspan controller receiving said power management traffic and determining said power distribution to said third plurality of data ports based on said power management traffic.

16. The communications system of claim 15, wherein said first and second communications links operate according to an Ethernet based standard.

* * * * *

UNITED STATES PATENT AND TRADEMARK OFFICE
CERTIFICATE OF CORRECTION

PATENT NO. : 7,974,305 B2
APPLICATION NO. : 11/518942
DATED : July 5, 2011
INVENTOR(S) : Wael William Diab It is certified that error appears in the above-identified patent and that said Letters Patent is hereby corrected as shown below:

Column 9
Lines 20-21, Claim 2, please replace "one or more powered devices PD" with --one or more PDs--.

Column 9
Line 47, Claim 8, please replace "coupled to a PD device" with --coupled to a PD--.

Column 10
Line 25, Claim 13, please replace "said powered device" with --said one or more PDs--.

Column 10
Lines 29-30, Claim 13, please replace "one or more PD devices" with --one or more PDs--.

Column 10
Lines 48-49, Claim 14, please replace "one or more PD devices" with --one or more PDs--.

Signed and Sealed this
Sixth Day of December, 2011

David J. Kappos
*Director of the United States Patent and Trademark Office*